April 21, 1936.  E. E. HEWITT  2,038,174
BRAKE CONTROL MEANS
Filed Aug. 1, 1935  3 Sheets-Sheet 1

INVENTOR
ELLIS E. HEWITT
BY
ATTORNEY

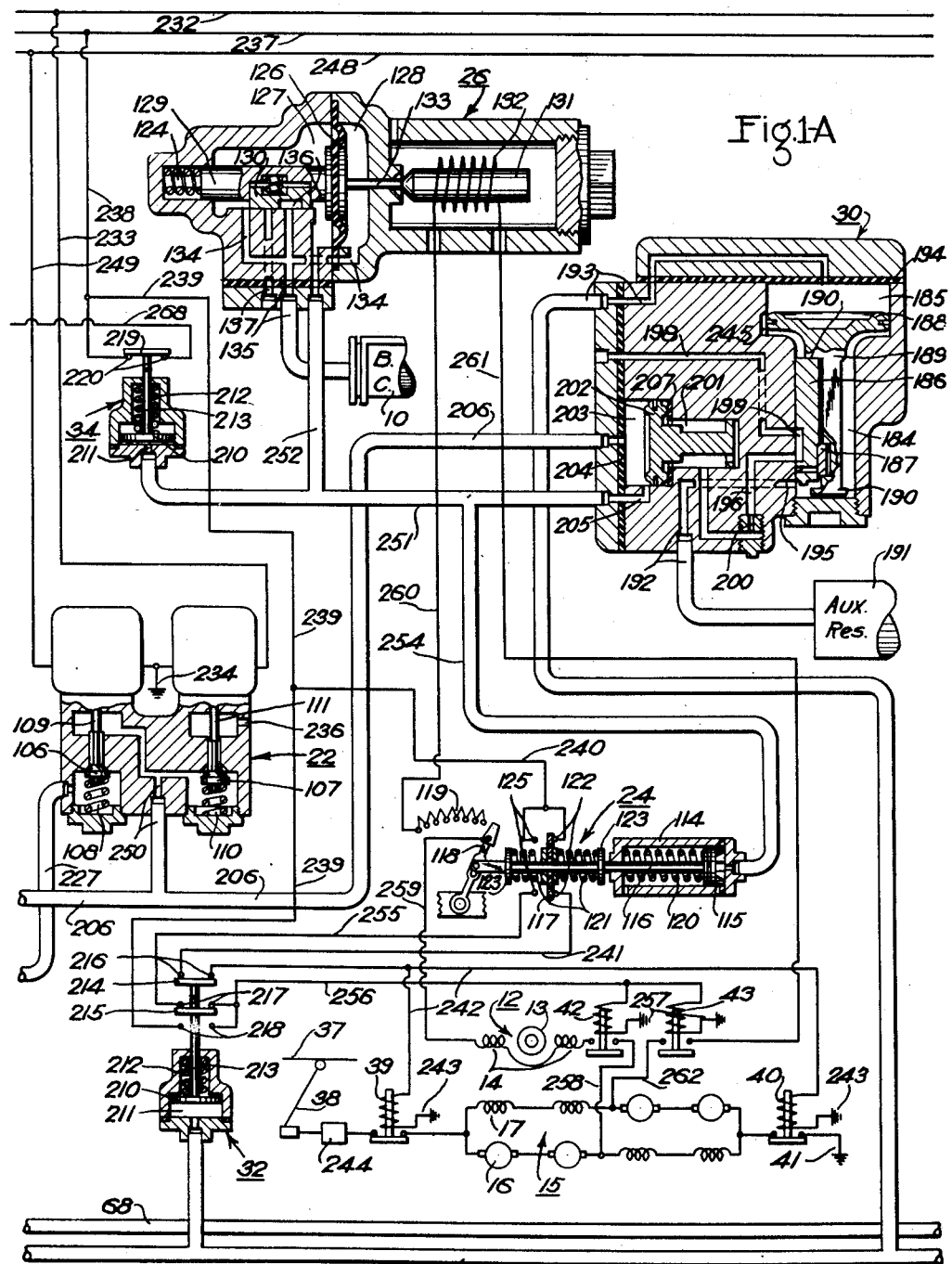

April 21, 1936.  E. E. HEWITT  2,038,174
BRAKE CONTROL MEANS
Filed Aug. 1, 1935  3 Sheets-Sheet 3

INVENTOR
ELLIS E. HEWITT
BY *Wm. M. Cady*
ATTORNEY

Patented Apr. 21, 1936

2,038,174

UNITED STATES PATENT OFFICE 2,038,174

BRAKE CONTROL MEANS

Ellis E. Hewitt, Edgewood, Pa., assignor to The Westinghouse Air Brake Company, Wilmerding, Pa., a corporation of Pennsylvania Application August 1, 1935, Serial No. 34,145

29 Claims. (Cl. 303—3)

This invention relates to brake control means, and more particularly to brake control means for high speed trains and vehicles employing both fluid pressure brakes and electric brakes.

In the operation of trains and railway vehicles at high speeds, it is essential that a braking equipment be provided which will produce high retarding forces, so that the train or vehicle may be brought to a stop in a reasonably short length of time. It is well known that a friction type brake is less effective at the high speeds than at the low speeds, due to the coefficient of friction between the rubbing parts of the brake being lower at the high speeds than at the low speeds. On the other hand, electrodynamic types of brakes, as for example the eddy current type brake or vehicle driving motors operating as dynamic brakes, are more effective at the high speeds than at the low speeds. It is therefore desirable that braking equipment provided for high speed trains should embody the characteristics of both the friction brake and the electrodynamic brake.

It is therefore a principal object of the present invention to provide a braking equipment for high speed trains and vehicles employing both friction type brakes and electrodynamic type brakes.

Where trains and railway vehicles are to be decelerated from relatively high speeds, it is desirable that the rate of deceleration be prevented from exceeding a selected maximum rate, so that sliding of the wheels will be prevented or greatly minimized. It is a further object of this invention to provide a brake equipment employing a friction type brake, an eddy current type brake, and a dynamic type brake, and means for so controlling applications of these three type brakes that the rate of deceleration produced will not exceed a selected maximum value.

In order that the braking characteristics of the friction type brakes and the electric type brakes shall be utilized to the best advantage, it is desirable that the electric type brakes be applied at the high speeds and that the friction type brakes be cut into action as the electric type brakes decrease in effectiveness. A further object of the invention, therefore, is to provide a combined friction and electric braking equipment in which the friction brakes are conditioned to be applied to a degree proportional to the decrease in effectiveness of the electric brakes.

A yet further object of the invention is to provide a brake equipment employing a friction brake, an eddy current brake, and a dynamic brake, in which applications are normally effected by applying the eddy current and dynamic brakes only, with the fluid pressure brakes conditioned as a "stand-by brake" to be cut into action as the eddy current and dynamic brakes decrease in effectiveness, or when the two electric brakes fail to produce as great a degree of braking as required by operation of the brake valve or brake controller.

A still further object of the invention is to provide a braking equipment employing the three types of brakes hereinbefore referred to, in which a control apparatus is provided for normally effecting applications of the brakes by electropneumatic operation, but operating to effect applications by automatic operation in case the intended application by electropneumatic operation fails to materialize to a predetermined degree in a chosen length of time.

A yet further object of the invention is to provide a braking equipment employing a novel arrangement of and interlocking features in connection with an eddy current brake, a dynamic brake, and a fluid pressure brake.

Yet further objects and advantages of the invention, dealing with specific constructions and arrangements of parts and apparatus, will be more fully understood from a detailed description of the invention, which is herein taken in connection with the attached drawings, wherein, Figs. 1 and 1—A, taken together, represent a view in schematic and diagrammatic form of an embodiment of the invention adapted for the head end car of a train.

While the embodiment disclosed has been shown as adapted to the head end car only of a train, as the description proceeds further it will be readily apparent to those skilled in the art which of the parts are duplicated on trailer cars in the train.

Figure 1:
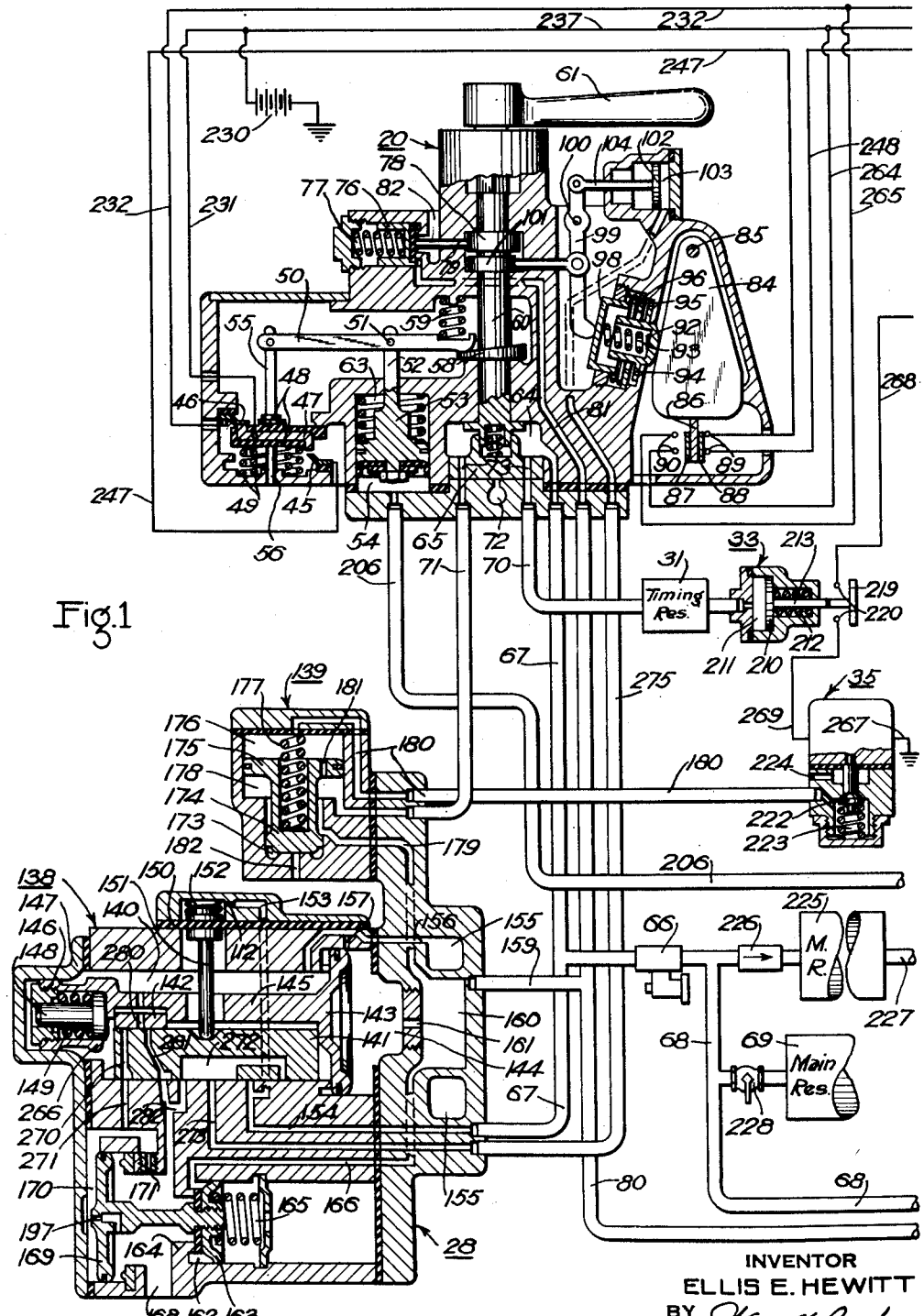

Referring now briefly at first to the embodiment disclosed in Figs. 1 and 1—A, the friction brakes are represented by the brake cylinder 10, while the eddy current brakes are represented by a single brake device 12 comprising a rotor 13 and windings 14. The dynamic brakes are shown at 15 as comprising a plurality of driving motors each of which has an armature 16 and a field winding 17.

For manually effecting applications of the brakes at desired times, there are provided a brake valve device 20, an application and release magnet valve device 22, and a combined rheostat and switch device 24.

For holding the fluid pressure or friction brakes unapplied, or applied to a limited degree only, so long as the eddy current and dynamic brakes are effective, there is provided an interlock valve device 26.

For effecting an emergency application of the brakes there are provided an emergency valve device 28, an automatic valve device 30, and a brake pipe interlock switch device 32.

For effecting an emergency application of the brakes upon failure of a service application to materialize to a predetermined degree in a chosen length of time, there are provided a timing reservoir 31, pneumatic switch devices 33 and 34, and a magnet valve device 35.

Considering now more in detail the apparatus and parts briefly referred to, the brake cylinders 10 may operate any type of friction brake, as for example the familiar shoe-on-wheel type brake, the degree of application of the brake being in accordance with the degree of fluid under pressure supplied to the brake cylinder.

The eddy current brake 12 may have its rotor 13 directly connected to a vehicle axle, or it may be secured to an extension of the shaft of a driving motor. The windings 14 are preferably stationary, and the degree of braking effect is preferably proportional to the degree of energization of these windings.

The dynamic brakes 15 are, of course, the driving motors disconnected from the source of power supply and then reconnected to operate as generators and thus produce a braking effect on the driven axles.

The driving motors 15 are preferably permanently connected in a closed circuit as shown in Fig. 1—A, and when they are to be operated to propel the vehicle current is supplied from a trolley wire 37, through a trolley 38, contacts of a line contactor 39, to the armatures 16 and field windings 17 of the motors, returning to the source by way of the contacts of a second line contactor 40 and ground connection 41.

When the motors are to be operated as generators, and thus produce dynamic braking, line contactors 39 and 40 are deenergized to open their contacts, and two braking contactors 42 and 43 are energized to establish a dynamic braking circuit, as will hereinafter be more fully described.

The brake valve device 20 is embodied in a casing provided with an application contact 45 and a release contact 46, each of these contacts being secured to and insulated from the casing. A movable contact 47 is provided for engagement with one or the other of the application and release contacts. The movable contact 47 is carried between two insulating members 48 and is normally urged upwardly by springs 49, so that in the upper position it engages the release contact 46.

For actuating the movable contact 47 downwardly, there is provided a lever 50 pivoted intermediate its ends at 51 to a stem 52 of a piston 53 disposed in a piston chamber 54. The left end of the lever 50 is pivotally secured to a stem 55, which stem is secured to the movable contact assembly 47. A second stem 56 is also secured to this contact assembly, and extends into a bore in the casing for guiding the upward and downward movement of the movable contact.

The right end of the lever 50 is urged by spring 59 into contacting relation with a cam 58 secured to a shaft 60. The shaft 60 is rotated by movement of a handle 61 secured thereto. The cam 58 has a contacting face such that as the shaft 60 is rotated upon movement of the handle 61 into a "Service zone" the lever 50 is rocked about its pivot 51 in a counterclockwise direction to disengage movable contact 47 from release contact 46 and to cause it to engage application contact 45. A spring 63 functions to hold the piston 53 in a biased position during this operation, so that the pivot 51 is thus relatively fixed.

When, however, fluid under pressure is supplied to the piston chamber 54 while the movable contact 47 is in engagement with the application contact 45, and the pressure of the fluid rises to a value such that spring 63 is compressed, lever 50 will rotate in a clockwise direction about its right end to cause movable contact 47 to disengage from application contact 45. The purpose of this operation of the movable contact 47 will be more fully understood hereinafter.

The brake valve device 20 is also provided with a chamber 64 in which is disposed a rotary valve 65. The chamber 64 is in constant open communication with a feed valve device 66 by way of pipe 67. The feed valve device 66 is connected to a main reservoir pipe 68, which in turn is connected to a main reservoir 69, and functions to maintain the pressure of fluid supplied to the pipe 67 from the main reservoir 69 at some predetermined value.

Figure 2:
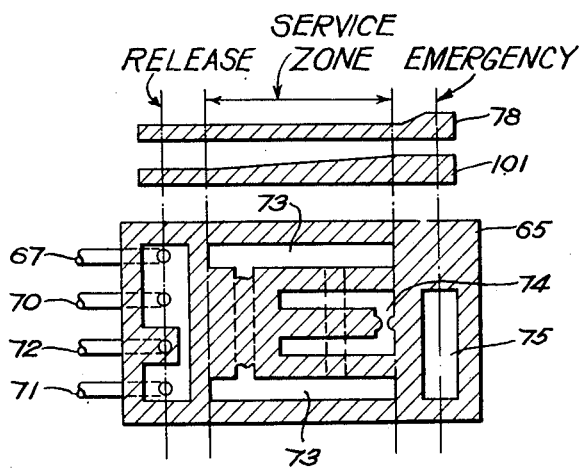
Fig. 2 is a view showing diagrammatically the connections formed for various operating positions of the brake valve device shown to the upper left in Fig. 1.

As will be clear from the view in Fig. 2, when the brake valve handle 61 is in "Release" position, the rotary valve 65 connects the pipe 67, and chamber 64, to a pipe 70 leading to the timing reservoir 31 and switch device 33, and also to a pipe 71 leading to the emergency valve device 28. In this position of the handle 61 the rotary valve 65 blanks an exhaust port 72.

When the handle 61 is moved to any position in the "Service zone" the pipe 71 is maintained connected to the chamber 64, but when the handle has been moved beyond a chosen point in the service zone, the pipe 70 is connected to the exhaust port 72 by way of restricted port 74 in the rotary valve.

When the handle 61 is moved to the "Emergency" position, pipes 70 and 71 are both connected to the exhaust port 72, by way of port 75 in the rotary valve.

In an upper part of the casing of the brake valve device 20, there is provided a vent valve 76 urged toward a seated position by a spring 77. A cam 78 secured to the aforementioned shaft 60 is adapted when the handle 61 is moved to the "Emergency" position to unseat the vent valve 76 through operation of a stem 79. When the valve 76 is unseated, a normally charged brake pipe 80, which extends throughout the train, is vented to the atmosphere, by way of passage 81, past the unseated valve 76 and through exhaust port 82. When the handle 61 is moved toward "Release" position, the cam 78 permits the stem 79 to move to the right under pressure of spring 77, until the vent valve 76 is seated. Venting of the brake pipe is then terminated.

Formed integrally with the brake valve device casing is a retardation controller mechanism comprising a pendulum 84 pivotally mounted at 85 and adapted to be swung to the left under the resulting force of inertia when the train is decelerated. The pendulum 84 is provided with a finger 86 having secured thereto and insulated therefrom, and from each other, two contacts 87 and 88. When the train is running at a substantially constant speed, or is at rest, the contact 88 engages and bridges two contacts 89. When the pendulum 84 swings through a predetermined distance to the left, during deceleration of the train, the contact 88 will have disengaged from the stationary contacts 89, and contact 87 will have engaged stationary contacts 90.

For opposing movement of the pendulum 84 to the left, there is provided a plunger mechanism comprising a movable plunger 92 which is urged into engagement with the pendulum by a spring 93. When the pendulum 84 has moved the plunger 92 through a short distance, flange 94 on the plunger engages a spring washer 95. A second spring 96 urges the spring washer 95 in a direction to oppose further movement of the plunger 92 to the left, so that after the flange 94 engages the spring washer 95 movement of the pendulum 84 to the left is opposed by the joint action of the two springs 93 and 96.

The spring 93 reacts against a movable abutment 98 which may be positioned through operation of a lever 99 to adjust the tension on the spring 93. The lever 99 is pivotally mounted to some part of the valve device casing at 100 and may be rotated in a counterclockwise direction through action of a cam 101 secured to the shaft 60, or through action of a piston 102 when fluid under pressure is supplied to a chamber 103 in which this piston is disposed. As will be observed, the piston 102 is connected to the lever 99 through a piston rod 104.

As may be seen from the development of cam 101 in Fig. 2, when the handle 61 is moved into the "Service zone", the cam 101 progressively rotates the lever 99 in a counterclockwise direction, to increase the tension on spring 93. This tension becomes a maximum as the handle 61 reaches the end of the "Service zone". In a like manner, when fluid under pressure is supplied to the chamber 103, the lever 99 is also rotated in a counterclockwise direction to accomplish the same result, and when fluid under pressure has been supplied to the chamber 103 to a maximum degree, the maximum tension will have been placed on the spring 93.

The application and release magnet valve device 22 is embodied in a casing provided with a supply valve 106 and a release valve 107. The supply valve 106 is urged toward a seated position by a spring 108 and toward an unseated position by an application electromagnet in the upper part of the valve device casing, which when energized forces a stem 109 downwardly to unseat the valve.

The release valve 107 is urged toward a seated position by a spring 110 and toward an unseated position by a release electromagnet in the upper part of the valve device casing, which when energized actuates a stem 111 downwardly to unseat the valve.

The combined rheostat and switch device 24 comprises a pneumatic cylinder 114 having a piston 115 therein operatively connected through a stem 116 to a movable contact 117 and to a contact arm 118, which arm is adapted to cut in or out of a connected circuit portion of a resistance 119.

The piston 115 is normally biased to the right in cylinder 114 by spring 120. When the piston is in this position, springs 121 bias the movable contact 117 to a position where it engages stationary contacts 122. The movable contact 117 is insulated from the stem 116 and springs 121 by means of insulating elements on either side thereof. The springs 121 react between collars 123 secured to the stem 116. The contact portion of the arm 118 is insulated from the arm proper through proper insulation, as is shown in the drawings.

When fluid under pressure is supplied to the cylinder 114 piston 115 is actuated to the left, and at a low pressure of the fluid thus supplied to the cylinder movable contact 117 is caused to be disengaged from stationary contacts 122 and to engage a second set of stationary contacts 125. At the same time, arm 118 is actuated to the left to engage the first step of and to cut out portions of the resistance 119, depending upon the degree of fluid under pressure supplied to the cylinder 114. When fluid under pressure is released from the cylinder 114, spring 120 returns the parts to the biased position shown.

The interlock valve device 26 is embodied in a casing provided with a diaphragm 126 so disposed within the casing as to form on one side thereof a chamber 127 and on the other side thereof a chamber 128. Operatively connected to the diaphragm 126 is a stem 129 which is recessed to receive and actuate a slide valve 130 coextensive with movement of the diaphragm 126. A spring 124 acts upon the left end of the stem 129 to bias the diaphragm 126, and slide valve 130, to a position to the right.

The diaphragm 126 is subject on its left hand side to the pressure of fluid supplied the chamber 127, and on its right hand side to pressure of fluid supplied to the chamber 128 and also to magnetic force exerted by a plunger 131 disposed within a solenoid 132. The plunger 131 exerts a force on the diaphragm 126 through means of stem 133, when current is supplied to the solenoid 132.

With the slide valve 130 in the position shown in the drawings, the two chambers 127 and 128 are in communication by means of a passage 134. At the same time, this passage also connects the two chambers to the brake cylinder 10 by way of pipe and passage 135.

When the diaphragm 126 and slide valve 130 are actuated to an intermediate position to the left, the passage 134 and an exhaust passage 137 are blanked by the slide valve 130 and when actuated to an extreme position to the left a cavity 136 in the slide valve connects pipe and passage 135 to exhaust passage 137, while continuing to blank passage 134, to thereby release fluid under pressure from the brake cylinder 10. When the diaphragm 126 and slide valve 130 return to their biased positions, the communication from the brake cylinder 10 to the atmosphere is cut off, and the brake cylinder is again connected to the chamber 127.

The emergency valve device 28 comprises a main portion 138 and an application valve portion 139.

The main portion 138 comprises a casing defining a slide valve chamber 140, in which is disposed a main slide valve 141 and on top of the main slide valve a graduating valve 142. For operating the main and graduating valves there is provided an emergency piston 143, disposed in a piston chamber 144 and having a stem 145 provided with a tail portion 146 slidably interfitting with a cap 147 secured to the casing of the main portion 138. Slidably disposed in the tail portion 146 is a tail stop 148, which is urged to a biased position by a spring 149, and which is adapted to engage one end of the main slide valve 141 when the emergency piston 143 moves outwardly to the right. The piston stem 145 is recessed to receive the graduating valve 142, so as to move the graduating valve coextensive with movement of the piston.

The main slide valve 141 is held upon its seat by a loading mechanism comprising a flexible diaphragm 150 mounted in the casing of the valve device and secured to a pin 151 bearing upon the main slide valve 141. A spring 152 exerts a constant downward pressure upon the diaphragm 150. The chamber above the diaphragm 150 is in communication with the aforementioned feed valve device 66 by way of choke 112, passages 153 and 154, and pipe 67, so that fluid pressure corresponding to that supplied by the feed valve device is at all times exerted on the upper side of the flexible diaphragm. The choke 112 is provided to prevent undue loss of pressure from the main reservoir 69 should the diaphragm 150 become ruptured during operation of the emergency valve device.

The slide valve chamber 140 is in communication with a quick action chamber 155, formed in the casing of the main portion 138, by way of a passage 156. A port 157 connects the passage 156 with the piston chamber 144, and is adapted to be disconnected from the piston chamber when the piston is moved from its extreme left hand position towards the right.

The emergency piston chamber 144 is in communication with the brake pipe 80 by way of branch pipe 159 and brake pipe chamber 160, which connects with the piston chamber 144 by way of port 161.

Formed in the lower part of the casing of the main portion 138 is a vent valve chamber 162 in which is disposed a vent valve 163 held upon a seat 164 by a spring 165. The vent valve chamber 162 is in communication with the aforementioned brake pipe chamber 160 by way of passage 166. The vent valve 163 therefore controls the flow of fluid from the brake pipe chamber 160, and hence the brake pipe 80, to the atmosphere by way of a large exhaust port 168.

For operating the vent valve 163 away from its seat, there is provided a vent valve piston 169. When fluid under pressure is supplied to piston chamber 170 at a rapid rate, the piston 169 actuates the vent valve 163 to unseated position to release fluid under pressure from the brake pipe 80. When the supply of fluid under pressure to the chamber 170 is at a slow rate, it may leak around the piston 169 to the atmosphere by way of choke port 171 without actuating the piston to unseat the vent valve.

The main slide valve 141 is adapted to control ports and passages for a purpose in any manner which will be more fully discussed in the description of operation of this embodiment of my invention.

The application valve portion 139 comprises a casing defining a valve chamber 173 in which is disposed a valve 174 formed integrally with a piston 175. The piston 175 is subject on its upper side to pressure of fluid in a chamber 176 and also to pressure of a spring 177, and is subject on its lower side to pressure of fluid from a chamber 178. The spring 177 maintains the valve 174 in seated position when the pressures in the chambers 176 and 178 are substantially equal.

When the valve 174 is seated the chamber 178 is in communication with the brake pipe chamber 160 by way of passage 179. The chamber 178 is also in constant communication with the aforementioned pipe 71, so that as long as valve 174 is seated, passage 179 and pipe 71 are in communication.

The chamber 176 is in communication with the aforementioned magnet valve device 35 by way of pipe and passage 180, and is adapted to have fluid under pressure supplied thereto from the chamber 178 by means of a small port 181 in the piston 175. When the pressure in chamber 176 is suddenly reduced, the overbalancing pressure on the under side of piston 175, from chamber 178, actuates the piston 175 upwardly to unseat valve 174, and at the same time to disconnect passage 179 from pipe 71 and connect it to the atmosphere by way of exhaust port 182.

The automatic valve device 30 is embodied in a casing having a slide valve chamber 184 and a piston chamber 185. Disposed in the slide valve chamber 184 is a main slide valve 186 and disposed on top of the main slide valve is a graduating valve 187. Disposed in the piston chamber 185 is a piston 188 having a stem 189 recessed to receive the graduating valve 187, so as to move this valve coextensive with movement of the piston, and having shoulders 190 adapted to engage the main valve 186 after a lost motion movement of the piston.

The slide valve chamber 184 is connected to an auxiliary reservoir 191 by way of pipe and passage 192. The piston chamber 185 is connected to the brake pipe 80 by way of pipe and passage 193. When the pressure of fluid supplied to the piston chamber 185 is reduced at an emergency rate, the overbalancing pressure acting on piston 188 from slide valve chamber 184 urges the piston upwardly into sealing engagement with the gasket 194. As the piston moves upwardly the graduating valve 187 uncovers a port 195 in the main slide valve 186, and as the piston reaches its uppermost position, the port 195 is brought into registration with a passage 196. The passage 196 contains a choke 200, which functions to restrict the rate of flow of fluid from the chamber 184 through the passage. In the uppermost position of piston 188, the main slide valve 186 blanks an exhaust passage 198.

When the pressure in chamber 185 is subsequently increased, the piston 188 moves downwardly and passage 196 is connected to exhaust passage 198 by way of cavity 199 in the main slide valve.

Passage 196 leads by way of choke 200 to a chamber 201 of a double check valve device having a piston 202. The piston 202 is subject on one side to pressure of fluid supplied to chamber 203 and on the other side to the pressure of fluid supplied the chamber 201. When the pressure in chamber 201 overbalances that in chamber 203 the piston 202 moves to the left into sealing engagement with gasket 204, and thus establishes a communication between the chamber 201 and a passage 205, while at the same time blanking communication with a straight air pipe 206. When the pressure in chamber 203 overbalances that in chamber 201, the piston 202 moves to the right into sealing engagement with gasket 207, where it establishes communication between the passage 205 and the straight air pipe 206.

The pneumatic switch devices 33 and 34, and the brake pipe interlock switch device 32, are similar in that each is embodied in a casing provided with a piston 210 disposed in a chamber 211 and urged outwardly by a spring 212. Each switch device 32 has a piston stem 213 for operating contacts according to movement of the piston 210.

In the case of the switch device 32 the piston stem actuates movable contacts 214 and 215 into engagement with stationary contacts 216 and 217, respectively, when the piston 210 is in its innermost position, while at the same time disengaging contact 215 from stationary contact 218. In the case of switch devices 33 and 34 the piston stem actuates movable contact 219 out of engagement with stationary contacts 220 when the piston 210 is in its innermost position.

The magnet valve device 35 is embodied in a casing provided with a valve 222 urged toward a seated position by a spring 223 and toward an unseated position by action of an electromagnet in the upper part of the valve device casing, which when energized actuates the valve downwardly. When the valve 222 is unseated a communication is established between the aforementioned pipe 180, leading to chamber 176 in the emergency valve device 28, and the atmosphere by way of exhaust port 224. When the valve 222 is seated this communication is cut off.

Two main reservoirs 69 and 225 are provided as sources of supply of fluid under pressure. The main reservoir 69 is intended to be connected to a compressor (not shown) and is adapted to charge the other main reservoir 225 through a one-way check valve device 226. This check valve device is intended to permit flow of fluid to the main reservoir 225 but to prevent flow in the opposite direction. This permits the main reservoir 225 to be always fully charged and available for effecting applications of the brakes on the head end car to the maximum degree, regardless of variations in pressure in the main reservoir 69. As will be seen from the drawings, the main reservoir 225 is connected by pipe 227 to the application and release magnet valve device 22.

The main reservoir 69 is adapted to supply fluid under pressure to the main reservoir pipe 68 and through the feed valve device 66 to the emergency valve device 28 and to the brake valve device 20, from whence the brake pipe 80 is charged to feed valve pressure. This feed valve device is intended to be one of the more commonly employed types, the function of which is to limit the pressure supplied therefrom to a predetermined value. This pressure is preferably a value appreciably below that normally obtaining in the main reservoirs 69 and 225, the purpose of which will appear more fully hereinafter.

When repairs are being made to the brake equipment, a cock 228, normally maintained in open position, may be turned to a closed position so as to isolate the equipment from the main reservoir 69, and hence from the compressor.

The operation of this embodiment of my invention for the head end car is as follows:

Running condition

When the train is running under power or coasting, the handle 61 of the brake valve device 20 is maintained in "Release" position, which is that indicated diagrammatically in Fig. 2. As before stated, in this postion of the brake valve handle movable contact 47 engages release contact 46 and is disengaged from application contact 45. The release electromagnet in the magnet valve device 22 is then energized from a battery 230 through a circuit which includes, beginning at the battery, conductor 231, contacts 47 and 46, train conductor 232, branch conductor 233, the release electromagnet and ground connection 234. Release valve 107 is thus held unseated so as to maintain the straight air pipe 206 in communication with the atmosphere, by way of pipe and passage 250, and exhaust port 236.

With the straight air pipe 206 in communication with the atmosphere, piston 115 in cylinder 114 of the combined rheostat and switch device 24 will be in the position shown in the drawings. Movable contact 117 will then engage stationary contacts 122.

The brake pipe 80 will be charged to feed valve pressure through a communication which beginning at the feed valve 66 includes, pipe 67, rotary valve chamber 64, rotary valve port 73, pipe 71, chamber 178, passage 179, brake pipe chamber 160, branch pipe 159, and brake pipe 80. With the brake pipe thus charged to normal pressure, piston 210 in brake pipe interlock switch device 32 will be urged to its innermost position, where it will cause contact 214 to engage stationary contacts 216 and contact 215 to engage contacts 217.

With the brake pipe interlock switch device 32 and the combined rheostat switch device 24 positioned as described, line contactors or switches 39 and 40 in the circuit to the driving motors 15 will be energized. The circuit for energizing these two contactors includes, beginning at the battery 230, train wire 237, conductors 238, 239 and 240, contacts 117 and 122, conductor 241, contacts 214 and 216, conductors 242, the two contactors 39 and 40, and ground connections 243. With the two line contactors 39 and 40 energized, and their contacts thus closed, current may be supplied to the car motors 15 from the trolley 38 through the circuit previously described.

It is customary, of course, to provide in this circuit a suitable control mechanism for controlling the degree of current supplied to the driving motors, and this control mechanism has been diagrammatically indicated at 244.

During running condition the auxiliary reservoir 191 is charged from the brake pipe 80 by way of feed groove 245 around piston 188 in the automatic valve device 30. The quick action chamber 155 in the emergency valve device 28 is charged from the brake pipe chamber 160 therein, and consequently from the brake pipe 80, by way of the port 157.

At the same time, timing reservoir 31 is charged to feed valve pressure by way of pipe 67, port 73 in rotary valve 65, and pipe 70. Since switch device 33 is connected to the timing reservoir 31 its piston 210 will be biased to its innermost position, so that its contact 219 is out of engagement with contacts 220.

The other parts of the equipment will be in the positions shown in the drawings, and the friction brake and eddy current brakes will thus be held released while the driving motors 15 are either propelling the vehicle or running idle while the vehicle is coasting.

Service application

When it is desired to effect a service application of the brakes, the brake valve handle 61 is moved into the "Service zone", as indicated at Fig. 2, to a degree according to the desired degree of braking. Cam 58 then rotates lever 50 in a counterclockwise direction to disengage contact 47 from release contact 46 and to cause it to engage application contact 45. The release electromagnet in the application and release magnet valve device 22 is thus deenergized, to close communication between the straight air pipe 206 and the atmosphere.

Engagement of contact 47 with application contact 45 causes energization of the application electromagnet in the application and release magnet valve device 22, through a circuit which, beginning at the battery 230, includes conductor 231, contacts 47 and 45, conductor 247, retardation controller contacts 88 and 89, train conductor 248, branch conductor 249, the application electromagnet and ground connection 234. Supply valve 106 is thus unseated to supply fluid under pressure from main reservoir 225 to the straight air pipe 206, by way of pipe 227, past the unseated supply valve 106, and pipe and passage 250.

The straight air pipe 206 is at this time in communication with the brake cylinder 10, by way of chamber 203 in automatic valve device 30, pipes 251 and 252, chamber 127 in interlock valve device 26, passage 134, and pipe and passage 135. If this communication were to remain open fluid under pressure would then flow from main reservoir 225, through the application and release magnet valve device 22, and through straight air pipe 206 to the brake cylinder 10.

However, fluid in the straight air pipe 206 flows to the cylinder 114 of the combined rheostat switch device 24, by way of pipe 254, and at a low pressure actuates the piston 115 to the left, to cause contact 117 to disengage from stationary contacts 122 and to engage stationary contacts 125.

Disengagement of contacts 117 from contacts 122 causes deenergization of the line contactors 39 and 40, and thus opens the circuit to the driving motors 15, if this circuit has not already been opened by operation of the motor control mechanism 244.

Engagement of contact 117 with stationary contacts 125 effects energization of the two braking contactors 42 and 43, through a circuit which is the same as that for the line contactors 39 and 40 up to and including conductor 240, from whence the circuit includes contacts 117 and 125, conductor 255, contacts 215 and 217, conductor 256, the two contactors 42 and 43, and ground connection 257.

Energization of the two braking contactors 42 and 43 establishes a braking circuit which includes conductor 258, contacts of braking contactor 42, windings 14 of eddy current brake device 12, conductor 259, contact arm 118, which has, due to movement of the piston 115, cut out a portion of resistance 119, conductor 260, solenoid 132 in the interlock valve device 26, conductor 261, contacts of braking contactor 43, and conductor 262. The driving motors 15, which are now acting as generators, will supply current to this circuit and thus operate as dynamic brakes, while the eddy current brake device 12 will also produce an electrodynamic braking effect.

The flow of current through the solenoid 132 will actuate the plunger 131 to the left and exert a force on the diaphragm 126 tending to shift slide valve 130 to its extreme left hand position. The degree of current supplied to the solenoid 132 is governed by the amount of resistance 119 remaining in the circuit, and since this resistance is approximately inversely proportional to the pressure of fluid supplied to the cylinder 114, it will be apparent that the degree of energization of the solenoid 132 will be approximately proportional to straight air pipe pressure.

Now the parts of the interlock valve device 26 are so designed that so long as the current in the dynamic braking circuit bears a predetermined relation to straight air pipe pressure, diaphragm 126 will be actuated to the extreme left and the brake cylinder 10 will be isolated from the straight air pipe 206 and vented to the atmosphere. If, however, the current in the dynamic braking circuit should not be high enough to maintain this relation, then the pressure of the fluid to the left of diaphragm 126 will actuate it to the extreme right, so that the brake cylinder 10 will be connected to the straight air pipe until the combined pressure of fluid supplied to chamber 128 and that exerted by plunger 131 shifts the slide valve 130 to its lap or intermediate position.

Fluid supplied to the straight air pipe 206 flows to chamber 54 in the brake valve device 20. When the pressure in chamber 54 has reached a value corresponding to the degree of movement of the handle 61 in the "Service zone" the piston 53 will have been actuated upwardly far enough to cause movable contact 47 to disengage from application contact 45, but not far enough to have engaged release contact 46. The application electromagnet in the application and release magnet valve device 22 will thus be deenergized to cut off the supply of fluid under pressure to the straight air pipe. It will thus be seen that straight air pipe pressure will correspond to the position of handle 61 in the "Service zone".

Now as the brake valve handle 61 is moved into the "Service zone" cam 101 actuates lever 99 in a counterclockwise direction to increase the tension on spring 93 in the retardation controller mechanism. The effect of this is to condition the retardation controller mechanism so that a given rate of retardation will be required to actuate pendulum 84 to the left far enough to disengage contact 88 from contacts 89. This predetermined rate of retardation therefore is determined by the position of the handle 61.

Now if the degree of braking produced by the combined action of the eddy current brakes and the dynamic brakes produces a rate of retardation higher than the preselected rate, then the pendulum 84 will move to the left to disengage contact 88 from contacts 89. This will open the circuit to the application electromagnet in the application and release magnet valve device 22, so that deenergization of this electromagnet is assured.

If the rate of retardation should increase to the point where the pendulum 84 swings far enough to the left to cause contact 87 to engage contacts 90, then the release electromagnet will be energized. This electromagnet is thus energized through a by-pass circuit from the train wire 237 to the train wire 232, which by-pass circuit includes conductor 264, retardation controller contacts 87 and 90, and conductor 265. The release valve 107 will then be unseated to release fluid under pressure from the straight air pipe 206.

As the pressure in the straight air pipe diminishes piston 115 will recede to the right, thus increasing the amount of resistance 119 in the dynamic braking circuit. The degree of electric braking will thus diminish until the pendulum 84 swings to the right to disengage contact 87 from contacts 90 and thus cut off further reduction in straight air pipe pressure. It is to be here understood that contact 117 does not disengage from contact 125 until substantially all of the resistance 119 has been cut out of circuit.

Now as the speed of the train diminishes the effectiveness of each of the eddy current brakes and the dynamic brakes diminishes. As the degree of current in the dynamic braking circuit diminishes, the force exerted to the right of diaphragm 126 by the plunger 131 diminishes so that the diaphragm will gradually move to the right. When slide valve 130 has uncovered passage 134, fluid will flow to the brake cylinder 10. At the same time, fluid flows through passage 134 to the chamber 128 until the force acting to the right of the diaphragm 126 overbalances that to the left of the diaphragm, whereupon the slide valve 130 is moved back to the left to lap the supply to the brake cylinder.

A little thought will show that as the current in the dynamic braking circuit diminishes the interlock valve device 26 will function to supply fluid under pressure to the brake cylinder 10 to apply the friction brakes to a degree corresponding to the decrease in braking effect produced by the two electric brakes. The train will thus be brought to a stop with the electric braking effect diminishing and the friction braking effect increasing.

If at any time during the deceleration period the rate of retardation should increase, then the retardation controller mechanism will function to reduce straight air pipe pressure, and thus prevent the rate of retardation from exceeding the preselected value.

When the train has been brought to a stop and it is desired to release the brakes, the handle 61 is returned to "Release" position. The release electromagnet is then energized to vent the straight air pipe to the atmosphere. The parts will then return to the positions shown in the drawings.

*Emergency application*

An emergency application of the brakes may be effected in either of two ways. In the first instance, an emergency application will automatically result upon failure of a service application to materialize to a chosen degree in a predetermined length of time. In the second instance, an emergency application may be intentionally effected by movement of the brake valve handle 61 to "Emergency" position.

Considering the former method first, when the handle 61 has been moved through a predetermined distance in the "Service zone" restricted port 74 in the rotary valve 65 connects pipe 70 leading to the timing reservoir 31 to the exhaust port 72. The pressure in the timing reservoir, and chamber 211 of switch device 33 will gradually reduce, and after a predetermined interval of time the pressure will have been reduced to the point where the piston 210 will move to the left far enough for contact 219 to engage contacts 220.

Now fluid supplied to the straight air pipe 206 also flows by way of pipe 251 to chamber 211 in the switch device 34. If the pressure of fluid supplied to the straight air pipe has not reached a value sufficient to actuate piston 210 of switch device 34 upwardly far enough to disengage its contacts 219 from its contact 220, then the closing of the contacts of switch device 33 will complete a circuit to the magnet valve device 35 and thus energize this device. The circuit formed to this device includes, beginning at the battery train wire 237, conductor 238, contacts 219 and 220 of switch device 34, conductor 268, contacts 219 and 220 of switch device 33, conductor 269, the magnet valve device 35 and ground connection 267. Valve 222 in this device will thus be unseated, to connect pipe 180 to the atmosphere, by way of port 224.

Chamber 176 in the emergency valve device will then be vented to the atmosphere, and the overbalancing pressure in chamber 178 will actuate the piston 175 upwardly and thus cause passage 179 to be connected to the atmosphere by way of port 182. Brake pipe chamber 160 and brake pipe 80 will then be vented to the atmosphere, and as the pressure in piston chamber 144 diminishes, the overbalancing pressure from slide valve chamber 140 will actuate the piston 143 to the right to a position where the tail stop spring 149 has been compressed to the point where the lower edge 266 of the tail portion 146 has engaged the main slide valve 141. When this takes place the graduating valve 142 will have uncovered main slide valve port 270, so that fluid under pressure flows from the slide valve chamber 140, and quick action chamber 155, through port 270 and passage 271, which registers with the port 270, to the chamber 170.

This flow takes place at a rapid rate so that sufficient pressure builds up in the chamber 170 to actuate the piston 169 to the right to unseat the vent valve 163. Unseating of this valve then further vents fluid under pressure from the brake pipe chamber 160, and brake pipe 80, to the atmosphere by way of the large exhaust port 168, so that there is a sharp drop in pressure immediately adjacent the piston 143, and to a degree such that the overbalancing pressure to the left of the piston actuates it, and consequently the slide valve 141, to the extreme position to the right. The slide valve 141, which up to this time has remained at rest, is thus moved to application position.

In application position, the slide valve 141 uncovers passage 271 and connects passage 154 by way of cavity 272, with passage 273 leading by way of pipe 275 to chamber 103 in the retardation controller mechanism of the brake valve device. Since passage 154 leads to the feed valve device 66, fluid at feed valve pressure is supplied to chamber 103, and piston 102 is actuated to the left to adjust the retardation controller mechanism for the maximum permissible rate of retardation.

The action of the emergency valve device 28 in quickly reducing brake pipe pressure causes the pressure in chamber 185 of the automatic valve device 30 to also diminish rapidly, so that the overbalancing pressure in slide valve chamber 184 actuates piston 188 to its uppermost position. As before explained, the auxiliary reservoir 191 is thus connected to the chamber 201, through port 195 in slide valve 186. Now since the pressure in the straight air pipe 206 is either zero or at a low value the piston 202 is actuated to the left, and fluid then flows from chamber 201 through passage 205 to pipe 251.

Fluid supplied to the pipe 251 flows by way of pipe 254 to the cylinder 114 of the combined rheostat and switch device 24. Contact 117 is then actuated to the left to engage contacts 125, but since, when the brake pipe pressure was reduced, piston 210 in the brake pipe interlock switch device 32 was actuated downwardly, the circuit formed by these contacts is interrupted due to disengagement of contact 215 from contacts 217.

However, contact 215 is now in engagement with contacts 218 so that a by-pass circuit is formed to the braking contactors 42 and 43, and the dynamic braking circuit is established as for a service application. The parts then thereafter function as during a service application, the interlock valve device 26 serving to either suppress or limit the degree of fluid supplied to the brake cylinder 10 according to the current in the dynamic braking circuit.

The retardation controller mechanism, now set for the maximum permissible rate, will not control this application since the application and release magnet valve device 22 is not now effective in controlling the pressure of fluid supplied to pipe 251. The degree of braking is not therefore limited by the retardation controller mechanism.

However, the pressure which may be established in pipe 251 by supply from the auxiliary reservoir 191 is preferably considerably lower than that supplied from the straight air pipe 206, so that there is less danger of producing sliding of the wheels.

In the emergency valve device 28, fluid in the slide valve chamber 140 and quick action chamber 155 will eventually be exhausted to the atmosphere by way of choke 171 and leak port 197 in piston 169. The vent valve device 163 will therefore be eventually seated by spring 165. A release of the brakes can then be effected by returning the brake valve handle 61 to "Release" position, whereupon the brake pipe 80 will again be charged and the parts of the emergency valve device 28 and automatic valve device 30 will return to release position.

In the automatic valve device 30, fluid supplied to pipe 251 will be vented to the atmosphere by way of slide valve cavity 199 and exhaust passage 198. In the emergency valve device fluid supplied to the retardation controller piston chamber 103 will be vented to the atmosphere by way of cavity 272 and exhaust passage 282.

Considering now the method of effecting an application from the brake valve device 20, when the brake valve handle 61 is turned to the "Emergency" position, cam 78 actuates stem 79 to the left to unseat the vent valve 76. Unseating of this vent valve vents the brake pipe 80 to the atmosphere by way of exhaust port 82. At the same time, port 75 in rotary valve 65 connects pipe 71 to exhaust port 72, and also vents the timing reservoir 31 to the atmosphere. Venting of pipe 71 to the atmosphere effects a reduction of pressure in chambers 160 and 144 of the emergency valve device 28. The emergency valve device 28 then functions as before described for the other emergency application to further vent the brake pipe 80 and to supply fluid at feed valve pressure to chamber 103 in the retardation controller mechanism.

As a consequence of the brake pipe reduction, brake pipe interlock switch device 32 opens its upper contacts and closes its lower contacts, while the automatic valve device 30 operates to connect the auxiliary reservoir 191 to chamber 201.

At the same time, movement of brake valve handle 61 to "Emergency" position deenergizes the release electromagnet in the magnet valve device 22 and energizes the application electromagnet. Fluid is then supplied from the main reservoir 225 to the straight air pipe 206 and thus flows to chamber 203. The pressure in the chamber 203 rises faster than the pressure in chamber 201, due to the choke 200 in the passage 196 restricting the flow to chamber 201.

In addition, the pressure which may be established in the straight air pipe 206 from the main reservoir 225 is higher than that which may be established due to supply from the auxiliary reservoir 191, so that the piston 202 in the automatic valve device 30 is maintained in its left hand position. Fluid then flows from chamber 203 to pipe 251 and from thence to the cylinder 114 and to the chamber 127 of the interlock valve device 26. From this point on the operation is substantially the same as that described for a service application, with the aforementioned difference that the dynamic brake circuit contactors 42 and 43 are energized through contacts 215 and 218 instead of through contacts 215 and 217, of the brake pipe interlock switch device 32.

Since the pressure of fluid supplied to the straight air pipe 206 is effective, and since this supply is controlled by the application and release magnet valve device 22, the retardation controller mechanism will be effective in preventing the rate of retardation from exceeding the maximum as determined by the supply of fluid at feed valve pressure to chamber 103.

If during this latter type of emergency application there should be a loss of straight air pipe pressure below the pressure existing in chamber 201 of the automatic valve device 30, then piston 202 will move to the left and connect chamber 201 with pipe 251. Fluid will then be supplied from the auxiliary reservoir 191 to effect the application, but as before explained to a somewhat lower degree. This insures that the train will be stopped if for some reason there should be an undue loss of straight air pipe pressure, or if straight air pipe pressure should fail to materialize.

To effect a release of the brakes following an emergency application of this type, the brake valve handle 61 is returned to "Release" position, whereupon the brake pipe 80 is again charged to feed valve pressure, the application electromagnet in the magnet valve device 22 deenergized and the release electromagnet energized to vent the straight air pipe. The parts will then return to the release positions shown in the drawings and the three types of brakes will be released.

It will be noted from the drawings that the magnet valve device 22 supplies fluid under pressure from the main reservoir 225 on the head end car. On trailer cars it is intended that the magnet valve devices 22 on these cars shall supply fluid from the main reservoir pipe 68. It will also be noted that the one-way check valve 226 prevents flow of fluid from the main reservoir 225 to the main reservoir pipe 68. The purpose of this arrangement is to insure that sufficient fluid under pressure to stop the train will be available on at least the head end car should there be a rupture of the main reservoir pipe 68 throughout the train.

Figure 3:
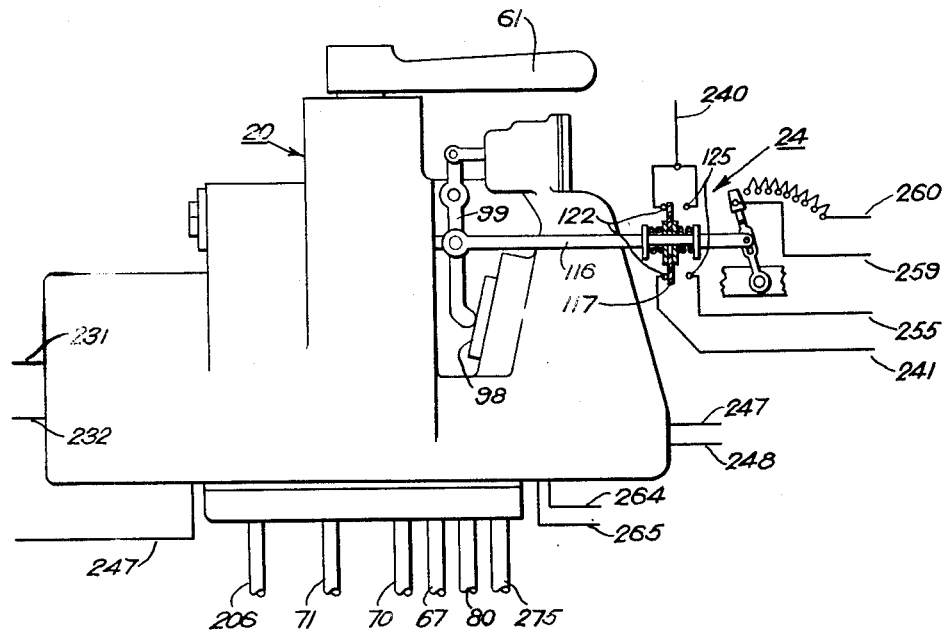
Fig. 3 is a partial view showing a modification of the embodiment shown in Figs. 1 and 1—A.

*Modification shown in Fig. 3*

The modification shown in Fig. 3 illustrates how the combined rheostat and switch device 24 of Fig. 1—A may be combined with the brake valve device 20 of Fig. 1. In this modification, the stem 116 of the combined rheostat and switch device had been connected to the lever 99 in the brake valve device in a manner such that when the handle 61 is moved into the "Service zone" the combined rheostat and switch device is operated in the same manner as when fluid was supplied to the operating cylinder 114. In all other respects the interconnection of the parts shown in Fig. 3 with the remaining parts shown in Figs. 1 and 1—A is the same as before described, and the operation differs from that before described only in that the combined rheostat and switch device is operated directly from the brake valve device instead of in response to pressure of fluid supplied to pipes 251 and 254.

Since in the previously described embodiment, during a service application, the pressure of fluid supplied to the straight air pipe corresponded to the position of handle 61, the operation of the combined rheostat and switch device shown in Fig. 3 will be substantially the same as that for the first described embodiment.

However, when effecting an emergency application upon failure of straight air pipe pressure to materialize, as before described, the operation of the combined rheostat and switch device shown in Fig. 3 will still correspond to position of the handle 61 rather than according to the pressure of fluid supplied from the auxiliary reservoir 191.

While I have described my invention with particular reference to one embodiment thereof, and one modification of this embodiment, it is to be understood that I do not intend to be limited to the particular apparatus disclosed, nor otherwise than according to the spirit and scope of the appended claims.

Having now described my invention, what I claim as new and desire to secure by Leters Patent, is:

1. In a vehicle brake system, in combination, fluid pressure brake means, eddy current brake means, dynamic brake means, a pipe, means for supplying fluid under pressure to said pipe, and means for conditioning each of said brake means to produce a braking effect according to the degree of pressure established in said pipe.

2. In a vehicle brake system, in combination, fluid pressure brake means, eddy current brake means, dynamic brake means, a pipe, means for effecting a supply of fluid under pressure to said pipe, means responsive to the pressure of fluid supplied to said pipe for controlling said eddy current brake means and said dynamic brake means, and means governed by said eddy current brake means and dynamic brake means for controlling said fluid pressure brake means.

3. In a vehicle brake system, in combination, fluid pressure brake means, eddy current brake means, dynamic brake means, a pipe, means for supplying fluid under pressure to said pipe, means responsive to a low pressure of fluid supplied to said pipe for rendering said eddy current brake means and said dynamic brake means effective to produce a braking effect, and means for controlling application of said fluid pressure brake means according to the degree of effectiveness of said eddy current and dynamic brake means.

4. In a vehicle brake system, in combination, fluid pressure brake means, eddy current brake means, dynamic brake means, a pipe, means for supplying fluid under pressure to said pipe, means for conditioning each of said brake means to be operable to produce a braking effect according to the pressure of fluid supplied to said pipe, and means governed by said eddy current brake means and said dynamic brake means for limiting the degree of effectiveness of said fluid pressure brake means according to the degree of effectiveness of said eddy current and dynamic brake means.

5. In a vehicle brake system, in combination, fluid pressure brake means, eddy current brake means, dynamic brake means, a dynamic braking circuit, means for connecting said eddy current brake means and said dynamic brake means in series in said braking circuit, and means controlled according to the current in said circuit for controlling application of said fluid pressure brake means.

6. In a vehicle brake system, in combination, fluid pressure brake means, eddy current brake means, dynamic brake means, a pipe, means for supplying fluid under pressure to said pipe, means responsive to pressure of fluid in said pipe for connecting said dynamic brake means and said eddy current brake means in series in a braking circuit, and electroresponsive valve means responsive to the current in said braking circuit for controlling the degree of application of said fluid pressure brake means.

7. In a vehicle brake system, in combination, vehicle driving motors adapted to be operated as dynamic brakes, a power circuit for supplying current to said motors, a power switch for controlling said power circuit, a dynamic braking circuit, a braking switch for controlling said braking circuit, a pipe, means for supplying fluid under pressure to said pipe, and means responsive to pressure in said pipe for causing said power switch to open said power circuit and said braking switch to connect said motors in said dynamic braking circuit.

8. In a vehicle brake system, in combination, a pipe, means for supplying fluid under pressure to said pipe to effect an application of the vehicle brakes, vehicle driving motors, means responsive to fluid supplied to said pipe for connecting said motors in a dynamic braking circuit, and means responsive to the degree of pressure in said pipe for varying the current in said braking circuit.

9. In a vehicle brake system, in combination, fluid pressure brake means, eddy current brake means, dynamic brake means, electroresponsive valve means for controlling applications of said fluid pressure brake means, and means for connecting said electroresponsive valve means, said eddy current brake means and said dynamic brake means in a series circuit, whereby when an application of said eddy current brake means and said dynamic brake means is effected said fluid pressure brake means is controlled by said electroresponsive valve means according to the effectiveness of said eddy current and dynamic brake means.

10. In a vehicle brake system, in combination, fluid pressure brake means, eddy current brake means, dynamic brake means, electroresponsive valve means having a winding and being operable to control applications of said fluid pressure brake means according to energization of said winding, means for connecting said winding and said eddy current brake means and said dynamic brake means in a series circuit, and fluid pressure operated means for controlling the degree of current in said circuit.

11. In a vehicle brake system, in combination, fluid pressure brake means, eddy current brake means, dynamic brake means, electroresponsive valve means having a winding and being operable to control applications of said fluid pressure brake means according to energization of said winding, means for connecting said winding and said eddy current brake means and said dynamic brake means in a series circuit, fluid pressure responsive means for controlling the degree of current in said circuit, and means for supplying fluid under pressure to said fluid pressure responsive means according to the desired degree of braking.

12. In a vehicle brake system, in combination, fluid pressure brake means, electric brake means, a pipe, means for effecting an application of said two brake means according to the pressure of fluid supplied to said pipe, means including contacts adapted to be manually operated to effect a supply of fluid under pressure to said pipe, and fluid pressure operated means adapted to be subsequently operated by fluid supplied to said pipe for effecting operation of said contacts to cut off said supply.

13. In a vehicle brake system, in combination, fluid pressure brake means, electric brake means, a pipe, a control element, contacts adapted to be operated in response to positioning of said element for effecting a supply of fluid under pressure to said pipe, means responsive to the pressure of fluid supplied to said pipe for effecting a full application of said electric brake means and a partial application of said fluid pressure brake means to produce a braking effect corresponding to the pressure of fluid in said pipe, and means operative when the pressure of fluid supplied to said pipe corresponds to the positioning of said control element for operating said contacts to cut off said supply.

14. In a vehicle brake system, in combination, fluid pressure brake means, electric brake means, a pipe, means for supplying fluid under pressure to said pipe, means responsive to the pressure of fluid supplied to said pipe for conditioning said two brake means to be operable to produce a braking effect according to the pressure in said pipe, and means operated according to the rate of retardation of the vehicle for limiting the degree of pressure in said pipe.

15. In a vehicle brake system, in combination, fluid pressure brake means, eddy current brake means, dynamic brake means, a pipe, means for effecting a supply of fluid under pressure to said pipe, means governed by the pressure of fluid in said pipe for controlling applications of said three brake means, and means operated according to the rate of retardation of the vehicle for varying the pressure in said pipe.

16. In a vehicle brake system, in combination, fluid pressure brake means, eddy current brake means, dynamic brake means, a pipe, means for effecting a supply of fluid under pressure to said pipe, means for effecting an application of said eddy current brake means and said dynamic brake means according to the pressure of fluid supplied to said pipe, means for controlling applications of said fluid pressure brake means according to the effectiveness of said eddy current and dynamic brake means, a retardation controller device operated according to the rate of retardation of the vehicle, and means responsive to operation of said retardation controller device at a preselected rate of retardation for diminishing the pressure of fluid in said pipe.

17. In a vehicle brake system, in combination, fluid pressure brake means, eddy current brake means, dynamic brake means, a pipe, means for supplying fluid under pressure to said pipe, means for controlling applications of said three brake means according to the pressure of fluid supplied to said pipe, a control handle, means for determining the pressure of fluid initially supplied to said pipe according to the positioning of said handle, means operated according to the rate of retardation of the vehicle for subsequently limiting the pressure in said pipe, and means for adjusting said last means according to the position of said control handle.

18. In a vehicle brake system, in combination, fluid pressure brake means, eddy current brake means, dynamic brake means, a control handle movable from a release position to various application positions, means for effecting an application of said eddy current brake means and said dynamic brake means according to the positioning of said handle, means controlled by said eddy current brake means and said dynamic brake means for controlling application of said fluid pressure brake means, a retardation controller mechanism operable to limit the rate of retardation produced by any one or combination of said brake means, and means for adjusting said retardation controller mechanism according to positioning of said control handle.

19. In a vehicle brake system, in combination, fluid pressure brake means, electric brake means, electropneumatic means for effecting an application of said electric brake means, means controlled by said electric brake means for controlling application of said fluid pressure brake means, and operable to increase the degree of application of said fluid pressure brake means as the degree of effectiveness of said electric brake means diminishes, and automatic means operable upon failure of said electropneumatic means to effect an application of said electric brake means to a chosen degree within a predetermined time for effecting an application of said electric brake means to a chosen maximum degree.

20. In a vehicle brake system, in combination, fluid pressure brake means, electric brake means, a pipe, means responsive to fluid under pressure supplied to said pipe for effecting an application of said electric brake means, means governed by said electric brake means for controlling the degree of application of said fluid pressure brake means and operable to increase the degree of application of said fluid pressure brake means as the degree of effectiveness of said electric brake means diminishes, electropneumatic means for supplying fluid under pressure to said pipe, automatic means for also supplying fluid under pressure to said pipe, and timing means operated in response to operation of said electropneumatic means for effecting operation of said automatic means upon failure of said electropneumatic means to establish a predetermined pressure in said pipe within a chosen length of time.

21. In a vehicle brake system, in combination, vehicle driving motors adapted to be operated as dynamic brakes, a first switch for controlling the supply of power current to said motors, a second switch for controlling the connection of said motors in a dynamic braking circuit, a brake pipe, and means controlled by the pressure of fluid in said brake pipe for controlling operation of said two switches.

22. In a vehicle brake system, in combination, a vehicle driving motor, a switch for controlling the supply of current to said motor, a second switch for connecting said motor in a dynamic braking circuit, a brake pipe, and means operated upon a reduction in brake pipe pressure for opening a circuit controlling said first switch and for closing a circuit controlling said second switch.

23. In a vehicle brake system, in combination, fluid pressure brake means, electric brake means, a straight air pipe, a brake pipe, a brake valve device, means responsive to movement of said brake valve device to an application position for effecting both a supply of fluid under pressure to said straight air pipe and a reduction in brake pipe pressure, means governed by straight air pipe pressure for effecting and controlling applications of said two brake means, and means operable upon a failure of straight air pipe pressure for controlling said last means in response to a reduction in brake pipe pressure.

24. In a vehicle brake system, in combination, fluid pressure brake means, eddy current brake means, dynamic brake means, a brake valve device having a plurality of service application positions and an emergency application position, fluid pressure operated mechanism for controlling applications of said eddy current brake means and said dynamic brake means, electroresponsive valve means for controlling applications of said fluid pressure brake means according to the effectiveness of said eddy current and dynamic brake means, means operated in response to operations of said brake valve device to a service application position for effecting a supply of fluid under pressure to said mechanism by electropneumatic operation, and means operative in response to operation of said brake valve device to emergency position for effecting a supply of fluid under pressure to said mechanism by electropneumatic operation or by automatic operation depending upon which predominates in pressure.

25. In a vehicle brake system, in combination, fluid pressure brake means, electric brake means, manually operated means for controlling applications of said two brake means, a retardation controller mechanism for also controlling applications of said two brake means, means for adjusting said retardation controller mechanism according to operation of said manually operated means, a brake pipe, and means operated upon a reduction in brake pipe pressure for adjusting said retardation controller mechanism for a maximum rate of retardation.

26. In a vehicle brake system, in combination, fluid pressure brake means, electric brake means, fluid pressure controlled means for controlling applications of said electric brake means, electroresponsive means for controlling applications of said fluid pressure brake means according to the degree of application of said electric brake means, a brake pipe, means operated upon a reduction in brake pipe pressure for effecting a supply of fluid under pressure to said fluid pressure controlled means, a brake valve device for initiating reductions in brake pipe pressure, and an emergency valve device operated in response to an initial reduction in brake pipe pressure for effecting a further reduction in brake pipe pressure.

27. In a vehicle brake system, in combination, electric brake means, a brake pipe, means connected to the brake pipe and operated upon a reduction in brake pipe pressure for closing a circuit to render said electric brake means effective to produce a braking effect, means for controlling the degree of braking effect produced by said electric brake means, and separate means also connected to the brake pipe and operated upon a reduction in brake pipe pressure for effecting operation of said last means.

28. In a vehicle brake system, in combination, an electric brake means, a brake pipe, means for initiating a reduction in brake pipe pressure, an emergency valve device responsive to an initial reduction in brake pipe pressure for effecting a further reduction in brake pipe pressure, a switch device responsive to reduction in brake pipe pressure for initiating an application of said electric brake means, a rheostat mechanism controlling said electric brake means and being operable to an operative position to increase the degree of application of said electric brake means, and means also responsive to a reduction in brake pipe pressure for effecting operation of said rheostat mechanism to said operative position.

29. In a vehicle brake system, in combination, fluid pressure brake means, electric brake means, a brake valve device having a set of fluid pressure brake controlling contacts and a set of electric brake controlling contacts, said brake valve device having a control element for manually operating said two sets of contacts, means responsive to operation of said fluid pressure brake contacts for effecting a supply of fluid under pressure to effect an application of said fluid pressure brake means, means responsive to operation of said electric brake contacts for effecting an application of said electric brake means, and means governed by said electric brake means and operable while said electric brake means is effective for controlling the supply of fluid under pressure effected in response to operation of said fluid pressure brake contacts.

ELLIS E. HEWITT.